United States Patent
Jone et al.

(10) Patent No.: US 8,123,266 B1
(45) Date of Patent: Feb. 28, 2012

(54) PET FECES COLLECTION DEVICE

(76) Inventors: David Jone, San Francisco, CA (US);
Wilson Jone, San Francisco, CA (US)

( * ) Notice: Subject to any disclaimer, the term of this patent is extended or adjusted under 35 U.S.C. 154(b) by 0 days.

(21) Appl. No.: 12/797,809

(22) Filed: Jun. 10, 2010

(51) Int. Cl.
*A01K 29/00* (2006.01)

(52) U.S. Cl. .......................... 294/1.5; 294/1.4

(58) Field of Classification Search ........... 294/1.3–1.5, 294/55; 15/257.1, 257.3, 257.4, 257.7, 257.9; 248/95, 99
See application file for complete search history.

(56) References Cited

U.S. PATENT DOCUMENTS

| | | | | |
|---|---|---|---|---|
| 956,803 | A * | 5/1910 | Fromm | 43/12 |
| 3,814,359 | A * | 6/1974 | Powell | 248/99 |
| 3,893,649 | A * | 7/1975 | Cornell et al. | 248/99 |
| 4,012,067 | A | 3/1977 | Travis | |
| 4,287,701 | A * | 9/1981 | Washington | 53/390 |
| 4,968,081 | A * | 11/1990 | Beight et al. | 294/104 |
| 5,413,394 | A * | 5/1995 | Mitchell | 294/1.1 |
| 6,386,606 | B1 | 5/2002 | Marshall | |
| 6,517,034 | B1 * | 2/2003 | Kinchen | 248/99 |
| 6,702,349 | B2 | 3/2004 | Clements | |
| 6,942,264 | B1 | 9/2005 | Mendez | |
| 2002/0096895 | A1 | 7/2002 | McCarthy | |
| 2005/0103952 | A1 * | 5/2005 | Evans | 248/99 |
| 2006/0001281 | A1 * | 1/2006 | Hubert | 294/1.5 |
| 2009/0045639 | A1 * | 2/2009 | Shalhoub | 294/1.5 |
| 2010/0019521 | A1 * | 1/2010 | Bowser | 294/88 |
| 2010/0072765 | A1 * | 3/2010 | Granado | 294/1.4 |

* cited by examiner

*Primary Examiner* — Paul T Chin

(57) ABSTRACT

A pet feces collection device for placement beneath a pet's derriere during the defecation process, the device including an annular support member at the end of a telescopic handle, the support member having a liner bag with an elasticized upper end removably engaging a support member groove for support within a support member aperture and a disposal bag removably disposed within the liner bag, the disposal bag having an elasticized top end that also engages the groove.

2 Claims, 3 Drawing Sheets

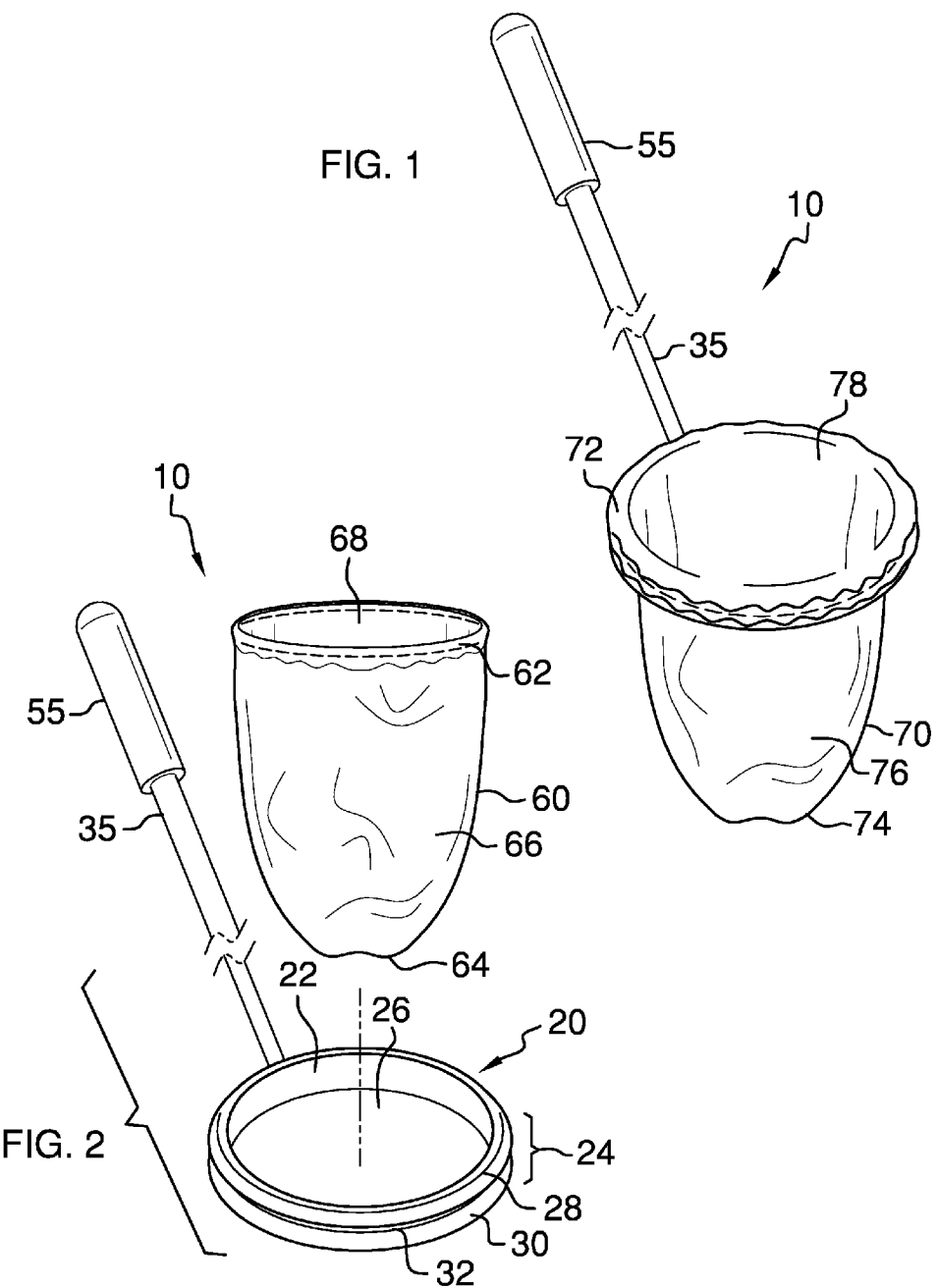

US 8,123,266 B1

PET FECES COLLECTION DEVICE

BACKGROUND OF THE INVENTION

Figure 3:
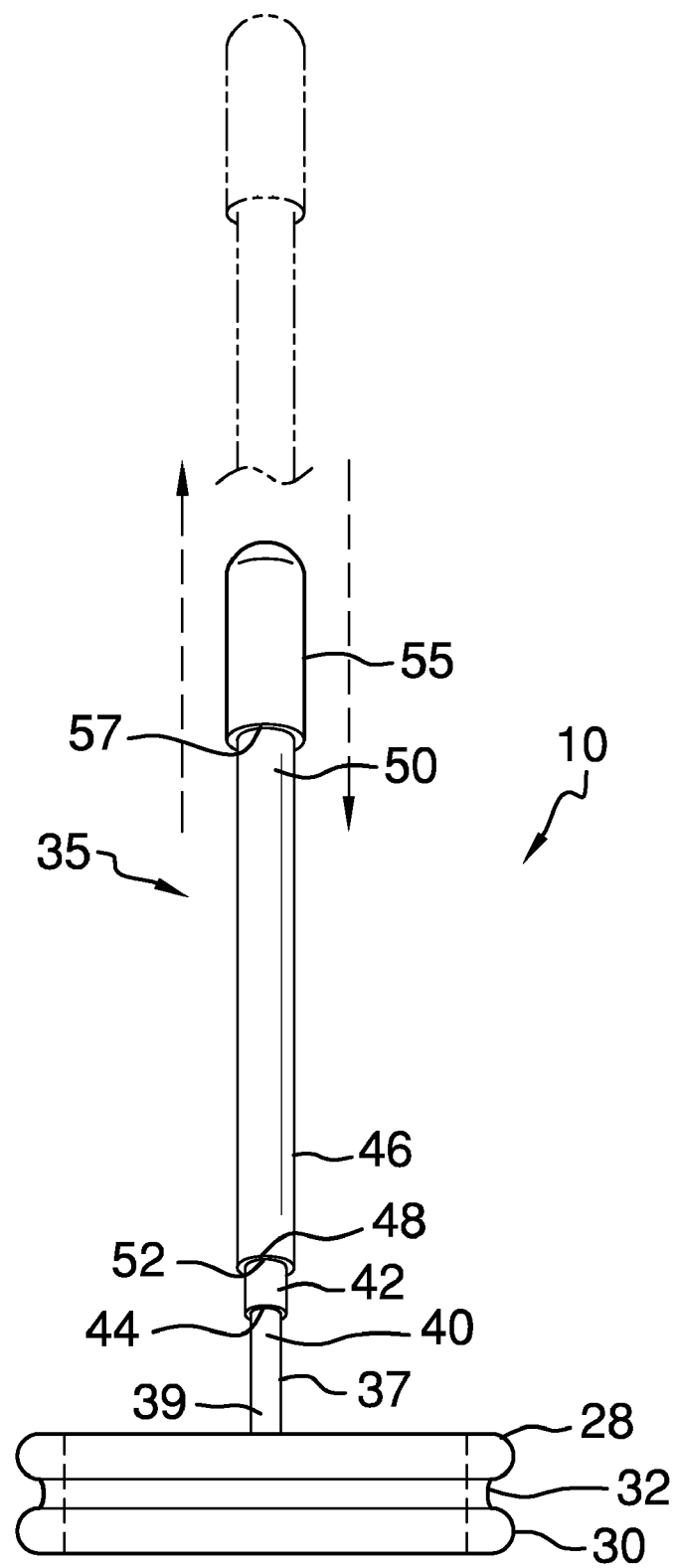

Various types of animal waste collection and disposal devices are known in the prior art. However, what is needed is a pet feces collection device for placement beneath a pet's derriere during the defecation process including an annular support member at the end of a telescopic handle, the support member having a liner bag with an elasticized upper end removably engaging a groove in the support member thereby supporting the liner bag within a support member aperture and a disposal bag removably disposed within the liner bag, the disposal bag having an elasticized top end which also engages the groove.

FIELD OF THE INVENTION

The present invention relates to animal waste collection and disposal devices, and, more particularly, to a pet feces collection device for placement beneath a pet's derriere during the defecation process which utilizes an annular support member at the end of a telescopic handle as well as a liner bag that removably attaches to the support member and a disposal bag removably disposed within the liner bag, each of the liner bag and the disposal bag having an upper end and top end, respectively, that removably engage a support member groove.

SUMMARY OF THE INVENTION

The general purpose of the present pet feces collection device, described subsequently in greater detail, is to provide a pet feces collection device which has many novel features that result in a pet feces collection device which is not anticipated, rendered obvious, suggested, or even implied by prior art, either alone or in combination thereof.

To accomplish this, the present pet feces collection device is designed for the collection and disposal of an amount of pet feces before the feces is released onto a ground surface. The pet feces collection device includes a substantially annular support member having top and bottom sections with a horizontal groove continuously disposed therebetween and an aperture through an inner wall of the support member. A telescopic handle is attached to the bottom section. The handle may be hingedly attached to the bottom section to permit the handle to fold over the support member for convenient transport and storage. A grip member disposed on the handle permits a user to maintain a firm, but comfortable, grip on the handle during use of the device to collect feces. At least one liner bag and one disposal bag are included. The liner bag has an open elasticized upper that removably engages the groove to permit replacement of the liner bag as needed. The disposal bag removably engages the liner bag. The liner bag provides added support to the disposal bag to prevent the disposal bag from tearing during the direct collection feces into the disposal bag during the pet's defecation process. Because the disposal bag is removable from the liner bag, the disposal bag may be separately disposed into a garbage receptacle and replaced, making the device re-usable. A first magnet disposed within a front side of the support member top section and a second magnet disposed within the upper section of the handle proximal to the bottom edge of the upper section releasably engage each other, thus releasably attaching the handle to the support member top section.

The annular shape of the support member accommodates the releasable engagement of the elasticized upper end of the liner bag and the elasticized top end of the disposal bag to the groove. The telescopic feature of the handle allows a user to extend the handle to accommodate the size of the pet as well as to place device beneath the derriere of the pet from a distance which, in turn, reduces the risk of making contact with the pet's feces and reduces other unpleasantries typically associated with a pet's defecation. Because the feces is collected directly from the pet into the disposal bag during the defecation process, no feces clean up is required. The present device is lightweight and durable, is virtually maintenance-free, and is reusable.

The device is designed to capture the pet's defecate before the defecate hits the ground. The device promotes health by reducing the risk of making contact with the pet's feces and also reduces a user's encounter with unpleasantries typically associated with a pet's defecation. The present device avoids residual defecate discharge on the ground or pavement where anyone could step into the pet's defecate or an unsuspecting child might come into contact with the pet's defecate.

Thus has been broadly outlined the more important features of the present pet feces collection device so that the detailed description thereof that follows may be better understood and in order that the present contribution to the art may be better appreciated.

Numerous objects, features and advantages of the present pet feces collection device will be readily apparent to those of ordinary skill in the art upon reading the following detailed description of presently preferred, but nonetheless illustrative, examples of the present pet feces collection device when taken in conjunction with the accompanying drawings. In this respect, before explaining the current examples of the present pet feces collection device in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the pet feces collection device. It is therefore important that the claims be regarded as including such equivalent constructions insofar as they do not depart from the spirit and scope of the present invention.

Objects of the present pet feces collection device, along with various novel features that characterize the invention are particularly pointed out in the claims forming a part of this disclosure. For better understanding of the pet feces collection device, its operating advantages and specific objects attained by its uses, refer to the accompanying drawings and description.

BRIEF DESCRIPTION OF THE DRAWINGS FIGURES

Figure 4:
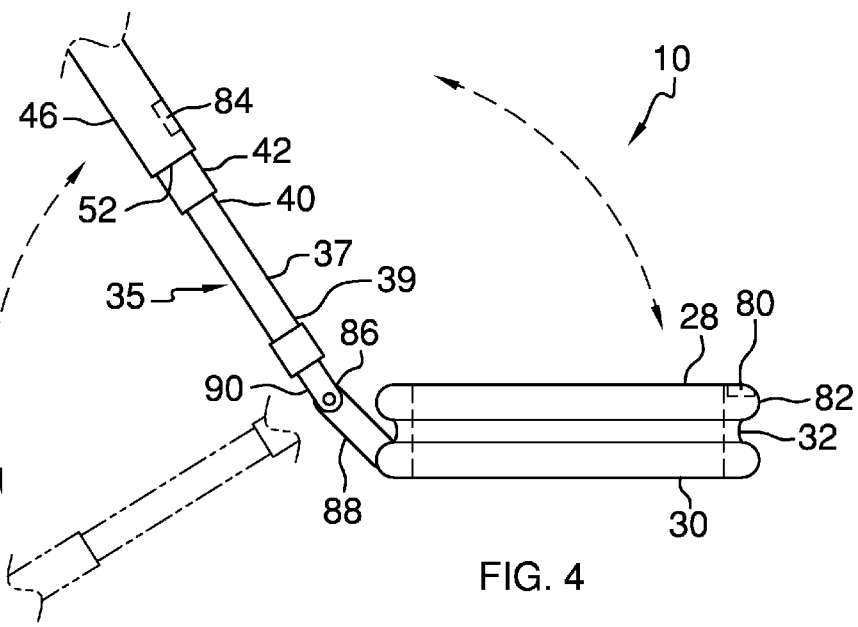
Figure 5:
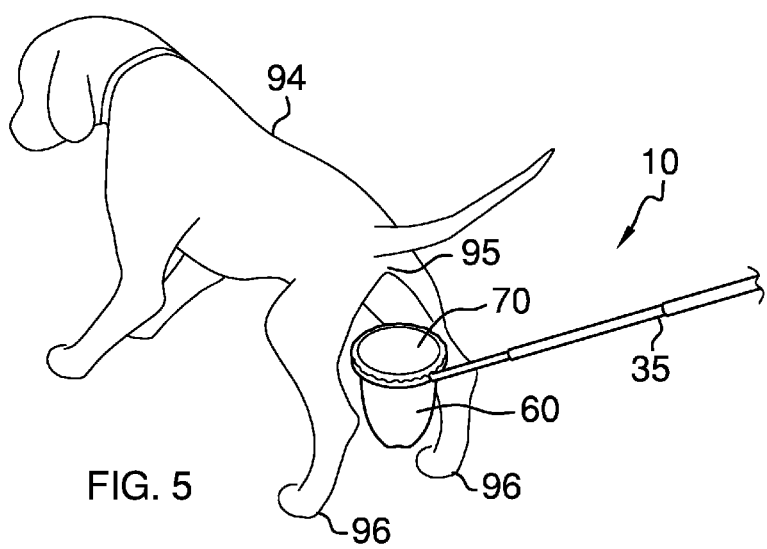

FIG. 1 is an isometric view.
FIG. 2 is an exploded isometric view.
FIG. 3 is a front elevation view.
FIG. 4 is a side elevation view of an alternate embodiment.
FIG. 5 is an in-use isometric view.

DETAILED DESCRIPTION OF THE DRAWINGS

With reference now to the drawings, and in particular FIGS. 1 through 5 thereof, example of the instant pet feces collection device employing the principles and concepts of the present pet feces collection device and generally designated by the reference number 10 will be described.

Referring to FIGS. 1 through 5 a preferred embodiment of the present pet feces collection device 10 is illustrated. The pet feces collection device 10 is designed for the direct collection and disposal of an amount of pet 94 feces during the pet's 94 defecation process. The pet feces collection device 10 includes a substantially annular support member 20 having an inner wall 22, an opposite outer wall 24, and an aperture 26 disposed within the entire inner wall 22. The support member includes a top section 28, a bottom section 30 opposite the top section 28, and a horizontal groove 32 continuously disposed between the top section 28 and the bottom section 30. The support member 20 is sized to fit beneath the derriere 95 of a pet 94 and between the rear legs 96 of the pet 94

The instant device 10 also includes a telescopic handle 35. The handle 35 includes a cylindrical lower section 37 having a proximal end 39 and an uppermost end 40. The proximal end 39 attaches to a portion of the outer wall 24 on the bottom section 30 of the support member 20. The handle 35 further includes a cylindrical middle section 42 having a first cavity 44 longitudinally disposed therethrough. The first cavity 44 slidingly engages the lower section 37. The middle section 42 has a diameter slightly greater than a diameter of the lower section 37. The handle 35 also has a cylindrical upper section 46 having bottom edge 48 and an opposite distal end 50 as well as a second cavity 52 longitudinally disposed therethrough. The second cavity 52 slidingly engages the middle section 42. The upper section 46 has a diameter slightly greater than the diameter of the middle section 42.

The instant device 10 also provides a substantially cylindrical grip member 55 having a third cavity 57 longitudinally disposed therein. The third cavity 57 engages the distal end 50 of the handle 35 upper section 46. The grip member 55 permits a user to maintain a firm, but comfortable, grip on the handle 35 during use of the device 10 to collect feces.

At least one liner bag 60 is included in the present pet feces collection device 10. The liner bag 60 has an open elasticized upper end 62, an opposite closed lower end 64, a continuous outside wall 66 disposed between the upper end 62 and the lower end 64, and a first opening 68 disposed within the entire outside wall 66. The liner bag 60 upper end 62 removably stretches over the support member 20 top section 28 and releasably engages the support member 20 groove 32. Because the liner bag 60 is removably attached to the support member 20, the liner bag 60 may be replaced as needed.

The present device 10 also includes at least one disposal bag 70. The disposal bag 70 has an open elasticized top end 72, an opposite closed bottom end 74, a continuous external wall 76 disposed between the top end 72 and the bottom end 74, and a second opening 78 disposed within the entire external wall 76. The disposal bag 70 is removably disposed within the liner bag 60. The disposal bag 70 top end 72 removably stretches over the liner bag 60 upper end 62 and removably engages the groove 32. The liner bag 60 provides added support to the disposal bag 70 to prevent the disposal bag 70 from tearing during direct collection of pet feces into the disposal bag 70 during the pet's 94 defecation process. Because the disposal bag 70 is removable from the liner bag 60, the disposal bag 70 may be separately disposed into a garbage receptacle and also replaced, making the device 10 re-usable.

The present pet feces collection device further includes a first magnet 80 disposed within a front side 82 of the support member 20 top section 28 and a second magnet 84 disposed within the second cavity 52 of the handle 35 upper section 46 proximal to the bottom edge 48 of the upper section 40. Thus, the handle 35 folds over the support member 20. Also, the second magnet 84 releasably engages the first magnet 80 whereby the handle 35 releasably attaches to the top section 28 of the support member 20.

A two-pieced hinge 86 having a first segment 88 and a second segment 90 is also included. The first segment 88 is attached to the support member 20 bottom section 30 while the second segment 90 is attached to the proximal end 39 of the handle 35 lower section 37. The hinge 86 hingedly attaches the handle 35 to the support member 20 to permit the handle to fold over the support member 20 thus promoting easier transport and storage of the device 10, thereby encouraging use of the device 10 for cleaning up a pet's 94 defecate.

The support member 20 is annular, rather than other shapes including a parallelepiped shape, in order to properly accommodate the releasable engagement of the elasticized upper end 62 of the liner bag 60 and the elasticized top end 72 of the disposal bag 70. The telescopic feature of the handle 35 allows a user to extend the handle to accommodate the size of the pet as well as to place device 10 beneath the derriere 95 of the pet 94 from a distance which, in turn, reduces the risk of making contact with the pet's 94 feces and reduces other unpleasantries typically associated with a pet's 94 defecation.

Use:

To use the present pet feces collection device 10, a user stretches the uppermost end 40 of one of the liner bags 60 over the top section 28 of the support member 20 and engages the uppermost end 40 into the groove 32 between the top section 28 and the bottom section 30 of the support member 20 and places the liner bag in an open position within the aperture 26 of the support member 20 and extending beneath the support member 20. The user also places a disposal bag 70 into the liner bag 60 with the top end stretched over the uppermost end 40 of the liner bag and engaged into the groove 32. The user then extends the telescopic handle 35 and places the support member 20 underneath the pet's 94 derriere 95 and between the pet's rear legs 96 to collect the pet's 94 feces into the disposal bag 70 during the pet's 94 defecation process and before the pet's 44 feces hits ground or pavement. Upon completion of the pet's 94 defecation, the user removes the device 10 from beneath the pet's 94 derriere 95 and lifts the disposal bag 70 out of the liner bag 60. The user then disposes of the disposal bag 70 containing the pet's 94 feces.

With respect to the above description then, it is to be realized that the optimum dimensional relationships for the parts of the present pet feces collection device to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

The term "pet" includes small household animals including, but not limited to, various sizes of dogs. Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A pet feces collection device comprising:
a substantially annular support member having an inner wall, an opposite outer wall, and an aperture disposed within the entire inner wall, the support member comprising:
  a top section;
  a bottom section opposite the top section;
  a horizontal groove continuously disposed between the top section and the bottom section;
a telescopic handle comprising:
  a cylindrical lower section having a proximal end and an uppermost end, the proximal end attached to a portion of the outer wall on the bottom section;
  a cylindrical middle section having a first cavity longitudinally disposed therethrough, the first cavity slidingly engaging the lower section, the middle section having a diameter slightly greater than a diameter of the lower section;
  a cylindrical upper section having bottom edge and an opposite distal end and further having a second cavity longitudinally disposed therethrough, the second cavity slidingly engaging the middle section, the upper section having a diameter slightly greater than the diameter of the middle section;
a substantially cylindrical grip member having a third cavity longitudinally disposed therein, the third cavity engaging the distal end of the handle upper section;
at least one liner bag having an open elasticized upper end, an opposite closed lower end, a continuous outside wall disposed between the upper end and the lower end, and a first opening disposed within the entire outside wall;
wherein the liner bag upper end removably stretches over the support member top section and releasably engages the support member groove;
wherein the support member is sized to fit beneath a pet's derriere and between a pet's rear legs;
at least one disposal bag having an open elasticized top end, an opposite closed bottom end, a continuous external wall disposed between the top end and the bottom end, and a second opening disposed within the entire external wall;
wherein the disposal bag is removably disposed within the second cavity of the liner bag;
wherein the disposal bag top end removably stretches over the liner bag upper end and removably engages the groove;
a first magnet disposed within a front side of the support member top section;
a second magnet disposed within the second cavity of the handle upper section proximal to the bottom edge of the upper section;
wherein the handle folds over the support member; and
wherein the second magnet releasably engages the first magnet whereby the handle releasably attaches to the top section of the support member.

2. A pet feces collection device comprising:
a substantially annular support member having an inner wall, an opposite outer wall, and an aperture disposed within the entire inner wall, the support member comprising:
  a top section;
  a bottom section opposite the top section;
  a horizontal groove continuously disposed between the top section and the bottom section;
a telescopic handle comprising:
  a cylindrical lower section having a proximal end and an uppermost end, the proximal end attached to a portion of the outer wall on the bottom section;
  a cylindrical middle section having a first cavity longitudinally disposed therethrough, the first cavity slidingly engaging the lower section, the middle section having a diameter slightly greater than a diameter of the lower section;
  a cylindrical upper section having bottom edge and an opposite distal end and further having second cavity longitudinally disposed therethrough, the second cavity slidingly engaging the middle section, the upper section having a diameter slightly greater than the diameter of the middle section;
a substantially cylindrical grip member having a third cavity longitudinally disposed therein, the third cavity engaging the distal end of the handle upper section;
at least one liner bag having an open elasticized upper end, an opposite closed lower end, a continuous outside wall disposed between the upper end and the lower end, and a first opening disposed within the entire outside wall;
wherein the liner bag upper end removably stretches over the support member top section and releasably engages the support member groove;
wherein the support member is sized to fit beneath a pet's derriere and between a pet's rear legs;
at least one disposal bag having an open elasticized top end, an opposite closed bottom end, a continuous external wall disposed between the top end and the bottom end, and a second opening disposed within the entire external wall;
wherein the disposal bag is removably disposed within the second cavity of the liner bag;
wherein the disposal bag top end removably stretches over the liner bag upper end and removably engages the groove;
a two-pieced hinge having a first segment and a second segment, the first segment attached to the support member bottom section, the second segment attached to the proximal end of the handle lower section;
wherein the handle hingedly attaches to the support member;
a first magnet disposed within a front side of the support member top section;
a second magnet disposed within the second cavity of the handle upper section proximal to the bottom edge of the upper section;
wherein the second magnet releasably engages the first magnet; and
wherein the handle upper section releasably engages the top section of the support member.

* * * * *